US012811312B2

(12) United States Patent
Contopanagos et al.

(10) Patent No.: US 12,811,312 B2
(45) Date of Patent: Nov. 24, 2026

(54) SMALL CELL ANTENNA

(71) Applicant: Argo Semiconductors SA, Hellinikon (GR)

(72) Inventors: Charalampos Contopanagos, Kifissia (GR); Emmanouil Frantzeskakis, Athens (GR)

(73) Assignee: Argo Semiconductors SA, Hellinikon (GR)

( * ) Notice: Subject to any disclaimer, the term of this patent is extended or adjusted under 35 U.S.C. 154(b) by 133 days.

(21) Appl. No.: 18/423,988

(22) Filed: Jan. 26, 2024

(65) Prior Publication Data

US 2024/0258710 A1 Aug. 1, 2024

Related U.S. Application Data

(60) Provisional application No. 63/482,203, filed on Jan. 30, 2023.

(51) Int. Cl.
*H01Q 21/06* (2006.01)
*H01Q 1/12* (2006.01)
*H01Q 9/04* (2006.01)

(52) U.S. Cl.
CPC ............... *H01Q 21/06* (2013.01); *H01Q 1/12* (2013.01); *H01Q 9/0414* (2013.01)

(58) Field of Classification Search
CPC ........ H01Q 21/06; H01Q 1/12; H01Q 9/0414; H01Q 9/0421; H01Q 21/205
See application file for complete search history.

(56) References Cited

U.S. PATENT DOCUMENTS 3,871,000 A * 3/1975 Tymann ................. H01Q 13/10 343/791
5,291,211 A * 3/1994 Tropper ............... H01Q 1/1228 343/890
5,988,583 A * 11/1999 Rhine ...................... H01Q 1/12 248/539
5,999,145 A * 12/1999 Niekamp ............ H01Q 21/293 343/890
6,448,930 B1 * 9/2002 Judd ...................... H01Q 1/007 343/700 MS
8,159,394 B2 * 4/2012 Hayes .................. H01Q 21/205 342/368
10,541,477 B2 * 1/2020 Powell ................... H01Q 21/08
10,658,741 B1 * 5/2020 Zekios ..................... H01Q 3/01
10,840,604 B2 * 11/2020 Jan ........................... H01Q 1/24
11,063,354 B2 * 7/2021 Jan ......................... H01Q 21/24
11,276,927 B2 * 3/2022 Logothetis ............... H01Q 3/06

(Continued)

*Primary Examiner* — Dameon E Levi
*Assistant Examiner* — Jordan E. DeWitt

(57) ABSTRACT

An antenna structure is disclosed. The antenna structure comprises: a plurality of supports; and a plurality of antennas, each of at least two antennas of the plurality of antennas being mounted on a respective one of the supports; wherein each of the at least two antennas are mounted on a side of their respective supports so as to face away from each other; and wherein at least two of the plurality of supports are laterally displaced from each other along one of their respective edges by a prescribed distance and are arranged to form a prescribed angle between themselves. Multiple ones of the antenna structure may be placed so as to provide full space coverage with sectorization, and some embodiments provide for at least partially overlapping coverage.

19 Claims, 9 Drawing Sheets

(56) References Cited

U.S. PATENT DOCUMENTS

| | | | | |
|---|---|---|---|---|
| 2003/0205021 | A1* | 11/2003 | Ryan | E04C 3/30<br>52/834 |
| 2015/0115117 | A1* | 4/2015 | Mummert | H01Q 1/1207<br>248/218.4 |
| 2019/0348742 | A1* | 11/2019 | Palmer | H01Q 1/1228 |
| 2020/0220263 | A1* | 7/2020 | Cheng | H01Q 9/065 |
| 2022/0352626 | A1* | 11/2022 | Ragos | H01Q 1/246 |
| 2022/0399918 | A1* | 12/2022 | Olesen | H04B 7/0413 |
| 2023/0171911 | A1* | 6/2023 | Maggi | G01P 1/023<br>361/752 |
| 2023/0395981 | A1* | 12/2023 | Contopanagos | H01Q 21/065 |
| 2024/0258710 | A1* | 8/2024 | Contopanagos | H01Q 9/0414 |
| 2025/0023256 | A1* | 1/2025 | Huang | H01Q 9/045 |

* cited by examiner

300

500

SMALL CELL ANTENNA

CROSS REFERENCE TO RELATED APPLICATIONS

This application claims the benefit of U.S. Provisional Application No. 63/482,203 filed on Jan. 30, 2023, the contents of which are incorporated herein by reference.

TECHNICAL FIELD

This invention relates to cellular wireless communication, and more particularly, to antenna structures for use in small cells.

BACKGROUND

Uniform signal strength is a desired but difficult to achieve characteristic of wireless signals used for communication, especially where the angle of coverage is greater than what a single directional antenna can cover. In this regard, it should be appreciated that when the signal from a directional antenna drops off by 3 dB from the maximum signal, such a reduced signal level is insufficient to claim that coverage is being provided. The maximum signal typically occurs in the direction straight ahead of the center of the antenna and signal drop off occurs as one moves laterally away from the antenna center.

Attempts by the prior art to achieve such uniform coverage required many antennas and complex arrangements, thus, undesirably, increasing the cost of such prior art wireless systems.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include an antenna structure. The antenna structure comprises: a plurality of supports; and a plurality of antennas, each of at least two antennas of the plurality of antennas being mounted on a respective one of the supports; wherein each of the at least two antennas are mounted on a side of their respective supports so as to face away from each other; and wherein at least two of the plurality of supports are laterally displaced from each other along one of their respective edges by a prescribed distance and are arranged to form a prescribed angle between themselves.

Certain embodiments disclosed herein include an antenna structure, comprising: at least two antenna arrangements, wherein each antenna arrangement comprises: two supports; and a plurality of antennas, each of at least two antennas of the plurality of antennas being mounted on a respective one of the supports; wherein each of the at least two antennas are mounted on a side of their respective supports so as to face away from each other; and wherein at least two of the plurality of supports are laterally displaced from each other along one of their respective edges by a prescribed distance and are arranged to form a prescribed angle between themselves; wherein each support of the at least two antenna arrangements has an edge opposite to the edge along which it is displaced from the other supports of the antenna arrangement of which it is a part, and wherein each such opposite edge is arranged to be substantially adjacent to an opposite edge of another one of the antenna arrangements so that the at least two antenna arrangements appear to form a simple polygon.

Other embodiments disclosed herein include an antenna structure, comprising: at least two antenna arrangements, wherein each antenna arrangement comprises: two supports; and a plurality of antennas, each of at least two antennas of the plurality of antennas being mounted on a respective one of the supports; wherein each of the at least two antennas are mounted on a side of their respective supports so as to face away from each other; and wherein at least two of the plurality of supports are laterally displaced from each other along one of their respective edges by a prescribed distance and are arranged to form a prescribed angle between themselves; and wherein at least a portion of another side of each support of each of the at least two antenna arrangements faces at least partly toward a portion of a support of another one of the at least two antenna arrangements.

BRIEF DESCRIPTION OF THE DRAWING

In the drawing:

FIG. 9 shows an illustrative embodiment of an antenna structure which employs three of the antenna structures of.

DETAILED DESCRIPTION

Figure 1:
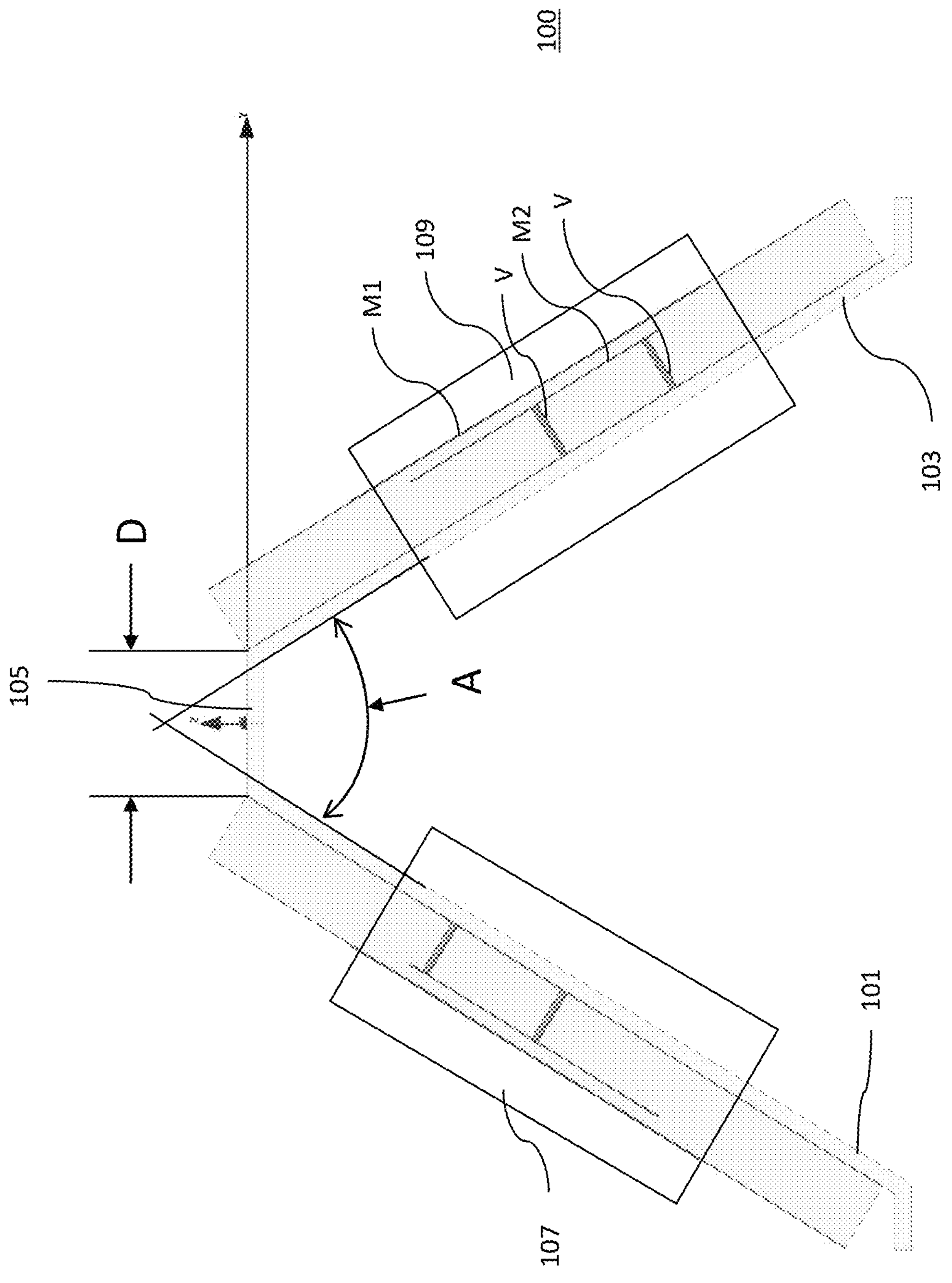
FIG. 1 shows an azimuthal view of an illustrative embodiment of an antenna structure employing two directional antennas in the horizontal direction that are arranged to provide uniform coverage over 180 degrees, in accordance with the principles of the disclosure.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

We have recognized that a substantially uniform signal strength may be achieved where the angle of coverage is greater than a single directional antenna can cover using at least two directional antennas mounted on a low-cost support, e.g., made of plastic, where the antennas face away from each other and the supports are displaced from each other laterally and being arranged to have an angle between themselves.

FIG. 1 shows an azimuthal view of an illustrative embodiment of an antenna structure 100 employing two directional antennas in the horizontal direction that are arranged to provide uniform coverage over 180 degrees, in accordance with the principles of the disclosure. Shown in FIG. 1 are supports 101 and 103 which are connected by connector 105 and on which are mounted, respectively, antennas 107 and 109.

Supports 101 and 103 may be made of plastic to keep costs low. However, other materials may be employed, e.g., rubber or metal. Supports 101 and 103 should be made of a material capable of withstanding the elements that are expected at the location at which antenna structure 100 is to be deployed. Supports 101 and 103 may each have the same length, width, and thickness. The length of each of supports 101 and 103 needs to be sufficient to at least be able to support antennas 107 and 109 mounted thereon. The length of each of supports 101 and 103 needs to be sufficient to at least be able to support a number of antennas 107 and 109 mounted thereon one adjacent to the other, this number being, for example 1, or 2, or 4, or 8. The width of each of supports 101 and 103 needs to be sufficient to at least be able to support antennas 107 and 109 mounted thereon. The width of each of supports 101 and 103 may range, for example, from 1 cm to 20 cm. The thickness of each of supports 101 and 103 needs to be sufficient to substantially prevent supports 101 and 103 from flexing under the conditions expected at the location at which antenna structure 100 is to be deployed. As will be readily apparent, the thickness will therefore depend upon the type of material employed to form supports 101 and 103. The thickness of each of supports 101 and 103 may range from, for example, 0.5 mm to 1 cm when plastic is employed to form supports 101 and 103.

In some embodiments, antennas 107 and 109 may be made separately and then affixed to supports 101 and 103, respectively. In other embodiments, antennas 107 and 109 may be formed integral with supports 101 and 103.

One or more of antennas 107 and 109 may employ the structure of any of the antennas disclosed in U.S. patent application Ser. No. 17/807,046 filed on Jun. 15, 2022, which is incorporated by reference as if fully set forth herein. However, as a quick overview, note that each of antennas 107 and 109 when employing the structure of an antenna disclosed in U.S. patent application Ser. No. 17/807,046 may be realized monolithically, i.e., in single-dielectric printed circuit board (PCB), utilizing three metal layers, "top" metal layer M1, also referred to herein as an antenna element, "intermediate" metal layer M2, also referred to herein as a coupler element, and "bottom" metal layer M3, also referred to herein as the ground plane. Top and bottom as used herein are relative to each other and defined with respect to supports 101 and 103, where bottom is the closest layer to the one of supports 101 and 103 on which the antenna is mounted. The metal employed for the metal layers may be copper, e.g., as generally employed for wiring traces and pads in PCBs, in some embodiments.

Note that in some embodiments each of the metal layers M1 and M2 may be circular in shape. In some embodiments, metal layer M3 is typically, but need not be, square or oblong with respect to square, which is referred to herein generally as rectangular. The shape of metal layer M3 need not be the same as that of metal layer M1 and/or metal layer M2. Also, typically, metal layer M3 is larger than either of metal layer M1 and metal layer M2.

Generally, antenna element metal layer M1, which is the patch antenna, and coupler element, i.e., metal layer M2 may be any polygon that has a symmetry under a 90° rotation around the central axis that goes perpendicular to, and through, metal layers M1, M2, and M3. Illustrative examples of such polygons include a square, a regular octagon, a 4-point star, an 8-point star, and so forth. Also, antenna element metal layer M1 and coupler element metal layer M2 need not have the same shape, so long as in embodiments where different shapes are employed both antenna element M1 and coupler element M2 respect the above-noted symmetry requirement. It will be appreciated by those of ordinary skill in the art that the circular shapes shown herein have the highest degree of symmetry.

Between top metal layer M1 and intermediate metal layer M2 is a dielectric layer of printed circuit board (PCB) and between intermediate metal layer M2 and bottom metal layer M3 is another dielectric layer of PCB. In various embodiments, the dielectric layers are made of the same dielectric material but they each have a different thickness as will be explained further hereinbelow. In an embodiment, a Rogers Corporation, now owned by Dupont, RO4003C low-loss dielectric or a standard FR4 PCB containing ISOLA FR408 dielectric may be employed, where FR4 is a National Electrical Manufacturers Association (NEMA) grade designation for glass-reinforced epoxy laminate material and where "FR" stands for "Flame Retardant". The number "4" indicates a type 4 woven-glass-reinforced epoxy resin.

In various embodiments, as suggested above, top metal layer M1 is employed as a patch antenna element and is fabricated on top of a PCB. Intermediate metal layer M2 operates as a coupler that couples signal for transmission from at least one of radio frequency (RF) feeding ports of the antenna structure to the antenna element without conductive direct contact, i.e., an electrical connection, to the antenna element, and hence may be referred to herein as a coupler. Bottom metal layer M3 is the ground, i.e., the ground plane, of the antenna. As noted, intermediate metal layer M2 is conductively connected to at least one of the feeding ports by a respective one of vertical vias V. At least one of the feeding ports is fed the signal to be transmitted by antenna structure, e.g., from respective coaxial cables, not shown, in the conventional manner.

Each signal is then transported from its one of the feeding ports by a respective one of vias V to the coupler, i.e., intermediate layer M2. Each of antennas 107 and 109 may have two vias, each one for a different polarization. Corresponding respective feeding ports, i.e., feeding ports located in the same relative position in one of antennas 107 and 109, are considered as a group. One group may be designated to contain the odd feeding ports while the other group may be designated to contain the even feeding ports.

Supports 101 and 103 are displaced from each other by distance D and are held in position by connector 105. Illustrative values of D are about 1 cm. It is desirable that D be smaller than the wavelength of the center frequency employed, i.e., λ, divided by 2, e.g., λ/2. D is measured at the closest point of the two antennas. In addition, supports 101 and 103 are maintained at an angle A, which may be in the range of between 60 and 90 degrees. Parameters D and A determine generally how wide the coverage is as well as how uniform it is.

The arrangement of FIG. 1 is said to have two antennas placed in a 2×1 setup, the notational convention being the Y-Z plane is horizontal with X the vertical axis.

Figure 2:
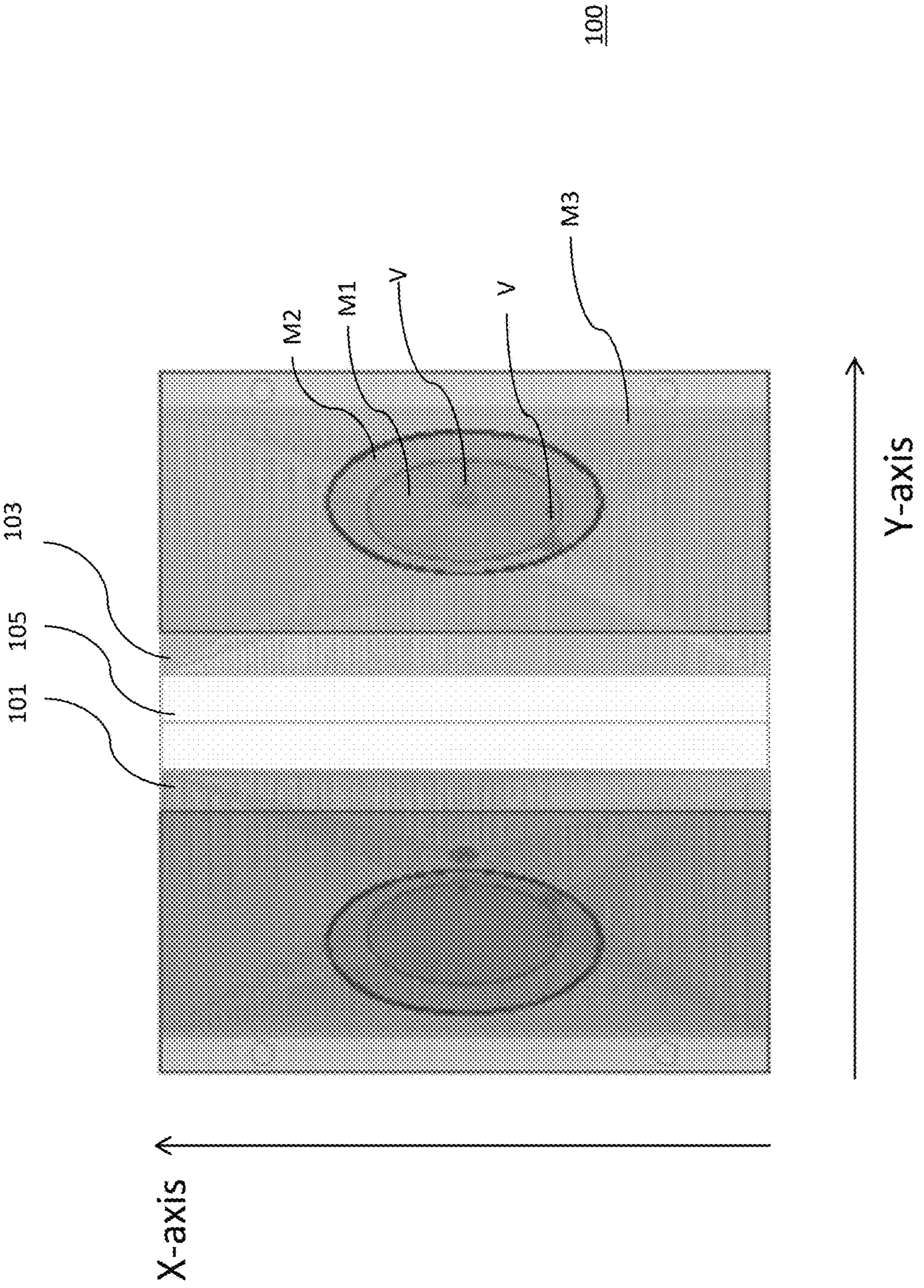
FIG. 2 shows a top view of the antenna structure shown in FIG. 1.

FIG. 2 is a top view of the structure shown in FIG. 1.

Figure 3:
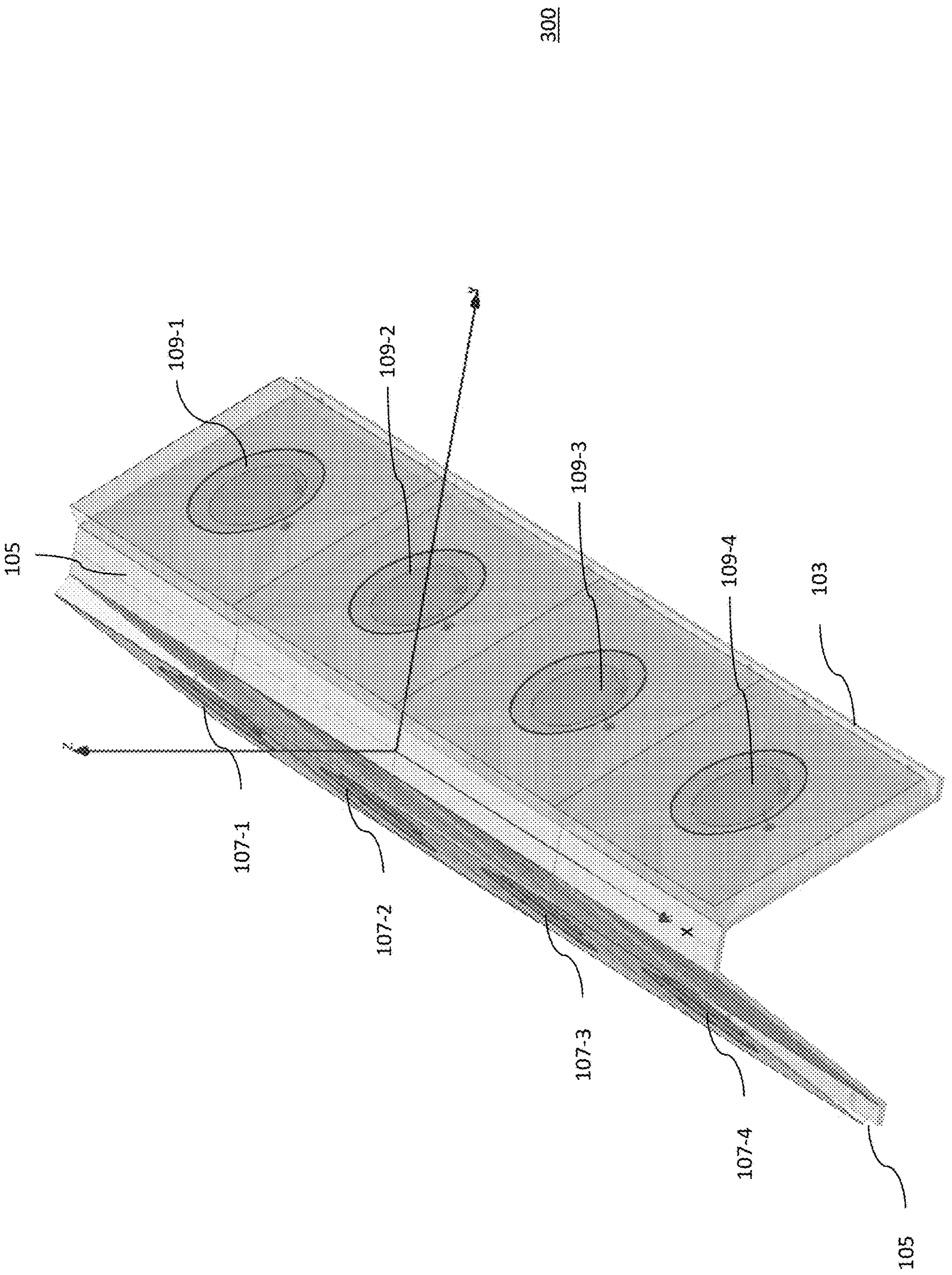
FIG. 3 shows a trimetric view of an illustrative embodiment of an antenna structure in which four antennas are mounted on a first support and four antennas are mounted on a second support.

FIG. 3 shows a trimetric view of an illustrative embodiment of an antenna structure 300 in which four antennas 107-1 to 107-4 are mounted on support 101 and four antennas 109-1 to 109-4 are mounted on support 103. Such an arrangement may be said to have eight antennas placed in a 2×4 setup, again, the notational convention being the Y-Z plane is horizontal with X the vertical axis. The vertical axis, i.e., elevation, is along the X-axis.

Antennas 107-1 to 107-4 and antennas 109-1 to 109-4 typically would have the same structure. For example, any of the antenna structures disclosed in U.S. patent application Ser. No. 17/807,046 filed on Jun. 15, 2022 maybe employed.

Figure 4:
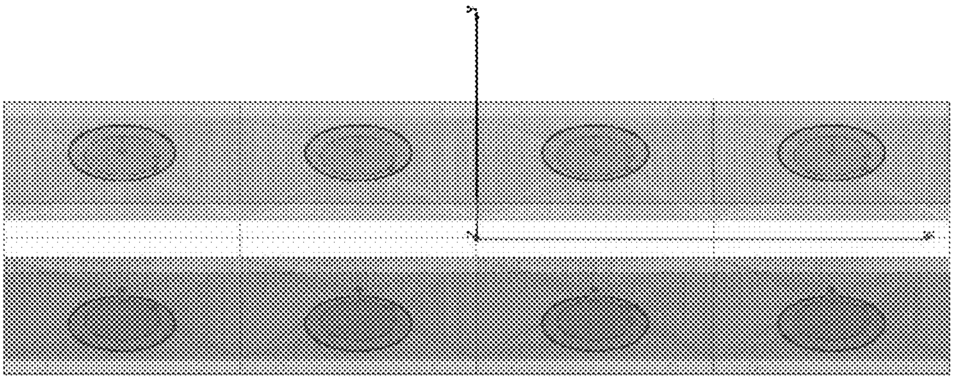
FIG. 4 shows a top view of the antenna structure of FIG. 3

FIG. 4 is a top view of antenna structure 300 of FIG. 3.

Figure 5:
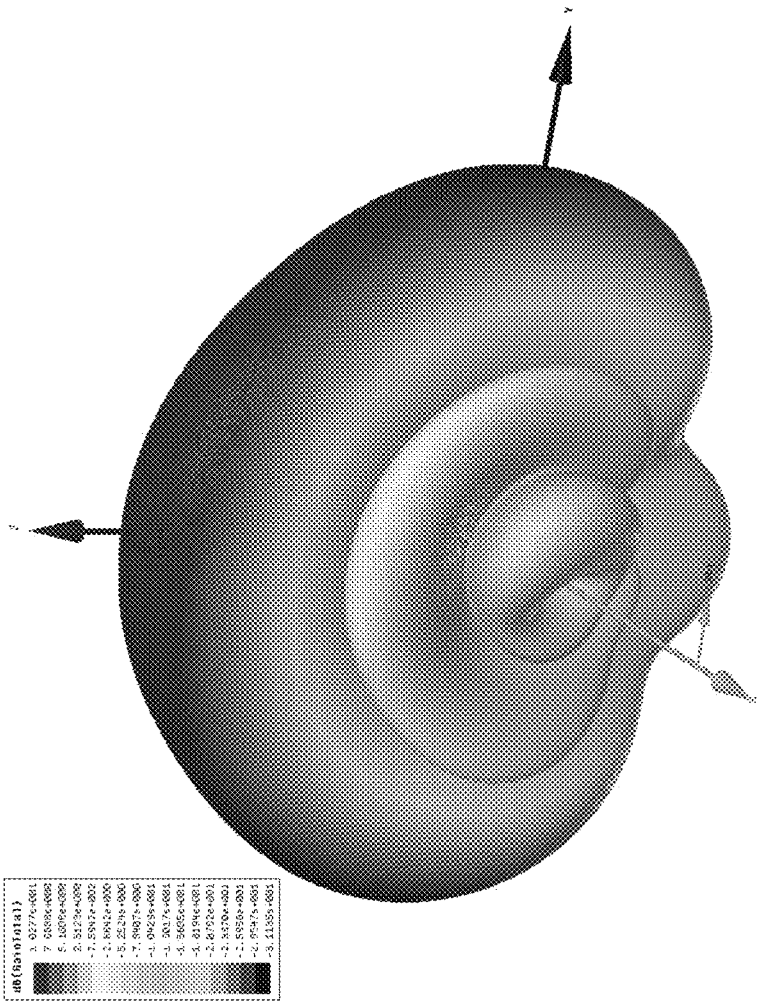
FIG. 5 shows three-dimensional profile of the total gain 3-D radiation pattern in true shape, logarithmic scale, of the antenna array structure of FIG. 3 at a center frequency of 3.5 GHz, with only the even numbered ports firing.

FIG. 5 shows three-dimensional profile 500 of the total gain 3-D radiation pattern in true shape, logarithmic scale, of antenna array structure 300 at a center frequency of 3.5 GHz, with the even numbered ports firing, i.e., being supplied with a signal for transmission, in-phase while the odd-numbered ports are inert. The maximum gain, broadside, is 10.28 dBi.

Figure 6:
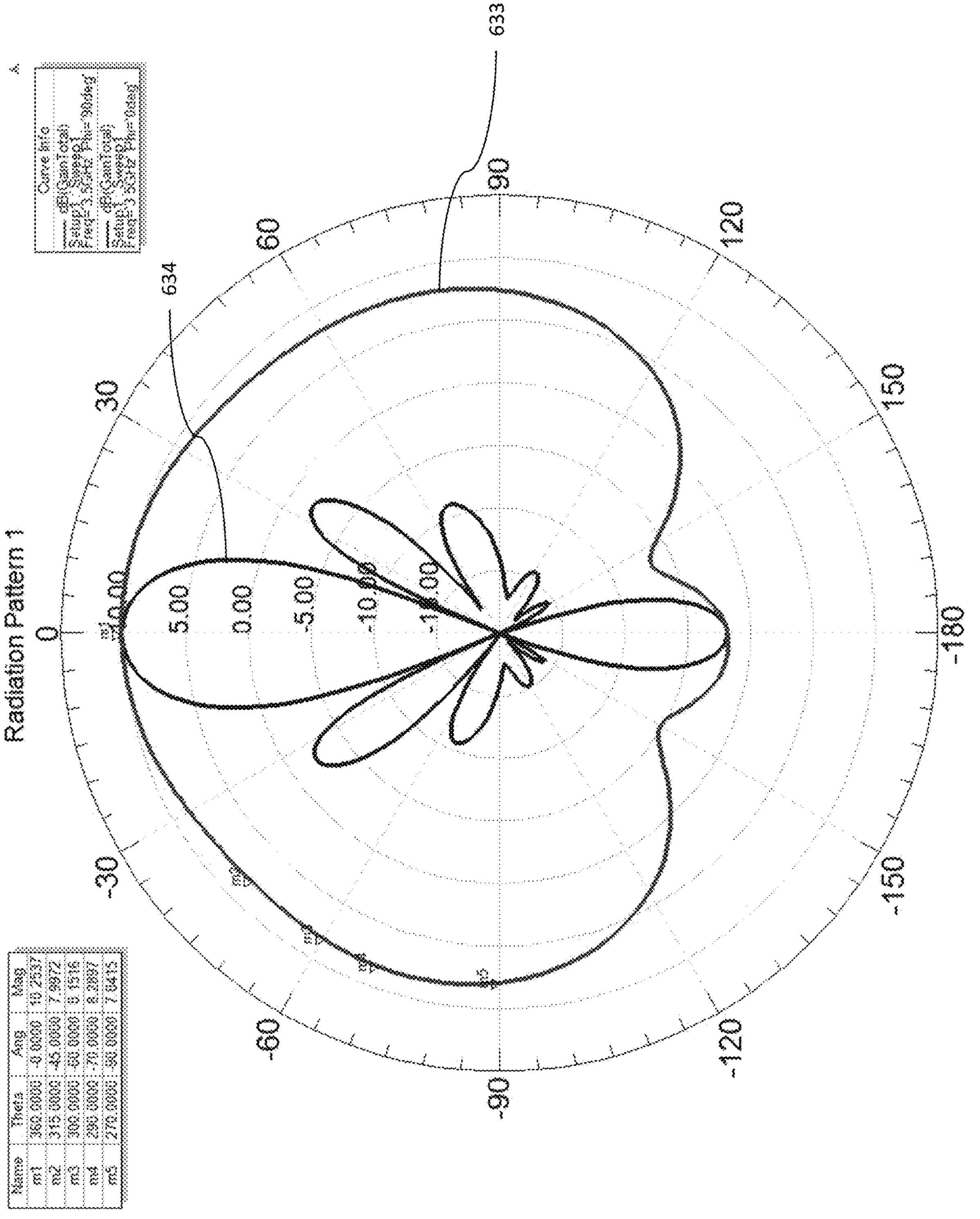
FIG. 6 shows a polar plot of the radiation gain pattern in dBi on two principal planes with only the even feeding ports firing.

FIG. 6 shows a polar plot of the radiation gain pattern in dBi on two principal planes with only the even feeding ports being supplied with a signal for transmission, i.e., firing, and no signal being supplied to the odd feeding ports, i.e., being inert. More specifically, FIG. 6 shows the radiated gain pattern cuts in dBi on two principal planes, the X-Z and the Y-Z planes of FIG. 3, with only even feeding ports being supplied with a signal for transmission and no signal being supplied to the odd feeding ports.

The plot is for half-space coverage, and in particular in the azimuth angle range from −90 degrees to +90 degrees.

The gain obtained from the electric field component directed along the X-axis are GX (θ, φ=0°) for the X-Z cut and GX (θ, φ=90°) for the Y-Z cut. These are very much suppressed. On the other hand, the gain obtained from the electric field component directed along the Y-axis which is GY (θ, φ=0°) for the X-Z cut and GY (θ, φ=90°) for the Y-Z cut, are the ones accounting for the total gain. The electromagnetic radiation emitted from antenna structure 300 is also very highly linearly polarized, with curves 633 and 634 of FIG. 6 showing the gain obtained from the electric field component directed along the Y-axis accounting for the total gain of the system.

For pedagogical purposes, the two independent polarizations have been chosen to be along the directions X and Y of FIG. 3. As will be appreciated by those of ordinary skill in the art, the two independent polarizations may be aligned along two different mutually orthogonal directions that are rotated by an angle φ0 relative to the antenna structure 300 by rotating the antenna structure 300 by an angle φ0 with respect to the fixed coordinate system of FIG. 1.

Figure 7:
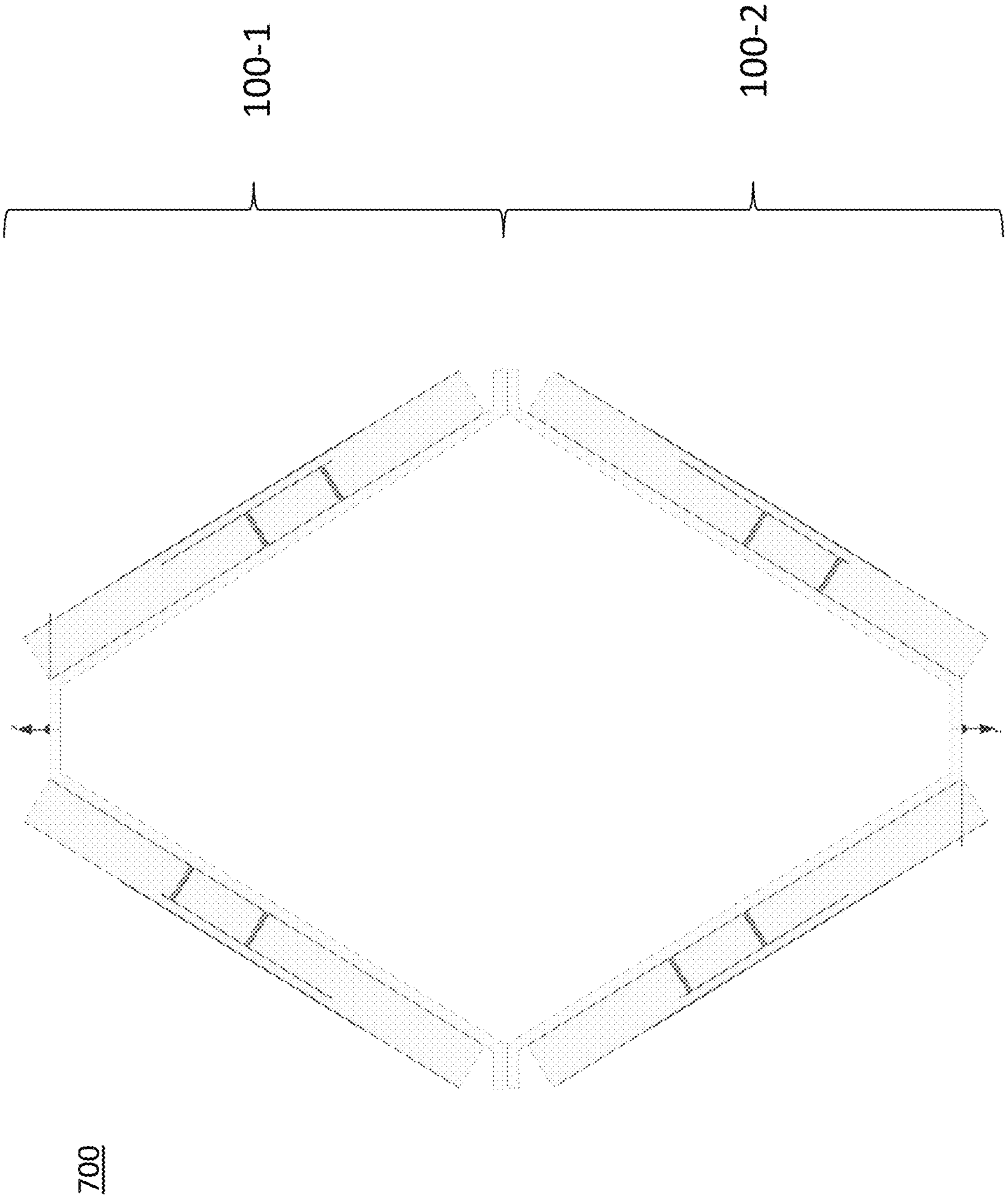
FIG. 7 shows an illustrative embodiment of an antenna structure which employs a pair of antenna structures of FIG. 1.

FIG. 7 shows an illustrative embodiment of an antenna structure 700 which employs a pair of antenna structures 100, i.e., 100-1 and 100-2 to achieve a full space coverage. There are four horizontal antennas, and the per-pair coverage is about 180 degrees, so that antenna structure 700 can be used in order to cover 360 degrees with two sectors, each covering 180 degrees.

Figure 8:
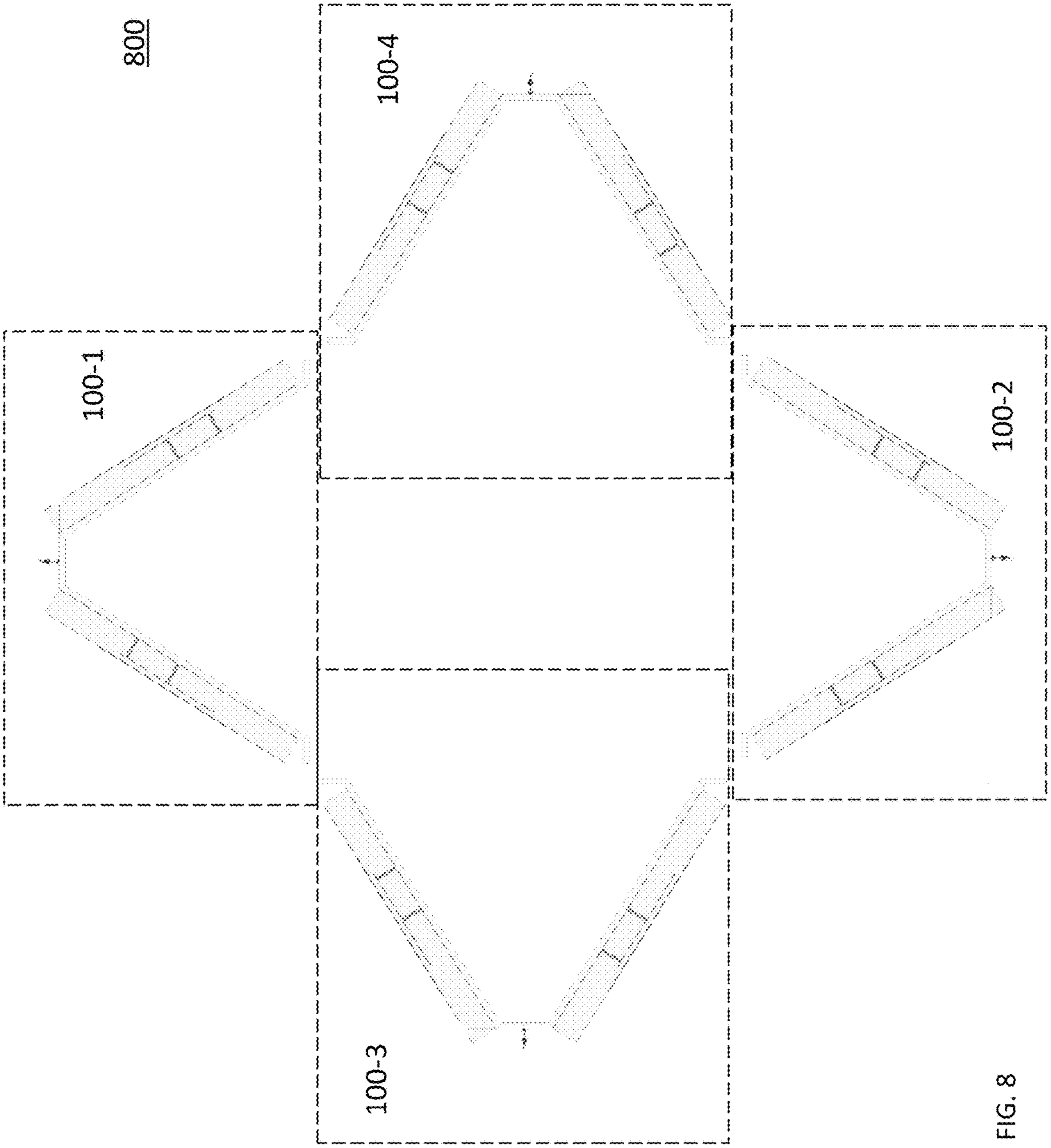
FIG. 8 shows an illustrative embodiment of an antenna structure which employs four of the antenna structures of FIG. 1.

FIG. 8 shows an illustrative embodiment of an antenna structure 800 which employs four of antenna structures 100, i.e., 100-1 to 100-4 to achieve a full space coverage, i.e., 360 degrees. There are eight horizontal antennas, and the per-pair coverage is about 90 degrees with another 90 degrees coverage overlapping redundantly with the corresponding coverage of adjacent pairs. Thus, antenna structure 800 can be used in order to cover 360 degrees with four sectors, each covering 90 degrees and providing redundant adjacent overlapping coverage.

Figure 9:
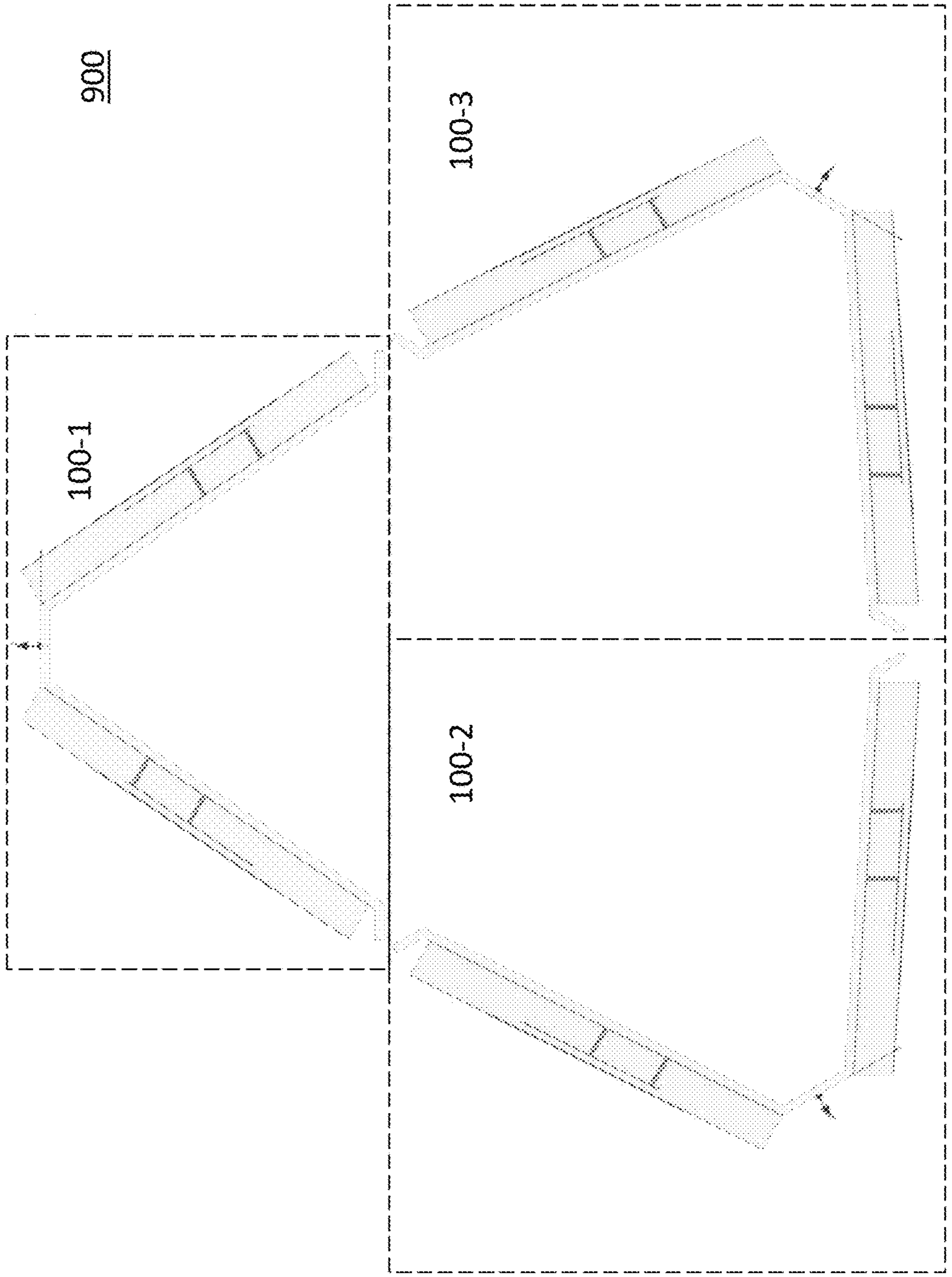

FIG. 9 shows an illustrative embodiment of an antenna structure 900 which employs three of antenna structures 100, i.e., 100-1 to 100-3 to achieve a full space coverage. There are six horizontal antennas, and the per-pair coverage is about 120 degrees with another 60 degrees coverage overlapping redundantly with the corresponding coverage of adjacent pairs. Thus, antenna structure 900 can be used in order to cover 360 degrees with three sectors, each covering 120 degrees and providing redundant adjacent overlapping coverage.

The foregoing merely illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An antenna structure, comprising:

a plurality of supports; and a plurality of antennas, each of at least two antennas of the plurality of antennas being mounted on a respective one of the supports; and a connector disposed between and physically coupling adjacent edge portions of at least two of the plurality of supports;

wherein each of the at least two antennas are mounted on a side of their respective supports so as to face away from each other; and wherein the at least two of the plurality of supports are laterally displaced from each other along one of their respective edges by a prescribed distance and are arranged to form a prescribed angle between themselves, wherein the prescribed distance is less than the wavelength of a center frequency to be transmitted from the antennas mounted to the at least two ofthe plurality of supports physically coupled by the connector;

the connector maintaining the prescribed angle and the prescribed lateral displacement between the at least two of the plurality of supports.

2. The antenna structure of claim 1, wherein at least one of the supports is made at least partly of one of plastic, metal, and rubber.

3. The antenna structure of claim 1, wherein each of at least two of the plurality of supports are substantially identical.

4. The antenna structure of claim 1, wherein each respective one of the supports has mounted thereon at least two of the plurality of antennas.

5. The antenna structure of claim 4, wherein each respective one of the supports has a length sufficient to accommodate all of the least two antennas mounted thereon.

6. The antenna structure of claim 1, wherein each respective one of the supports has a thickness sufficient to substantially prevent it from flexing under environmental conditions expected at a location at which the antenna structure is to be deployed.

7. The antenna structure of claim 1, wherein each of the antennas mounted on each respective one of the supports are implemented monolithically.

8. The antenna structure of claim 7, wherein each of the antennas mounted on each respective one of the supports are implemented in single dielectric printed circuit board utilizing three metal layers, a top metal layer (M1) that is an antenna element, an intermediate metal layer (M2) that is a coupler element, and a bottom metal layer (M3) that is a ground plane, wherein top and bottom are defined relative to each other and defined with respect to each of the supports such that the bottom metal layer is the metal layer that is closest to the one of supports on which the antenna is mounted.

9. The antenna structure of claim 8, wherein each of metal layers M1 and M2 are substantially circular in shape and metal layer M3 is one of square and rectangular in shape.

10. The antenna structure of claim 8, wherein each of metal layers M1 and M2 may each be shaped as any polygon that has a symmetry under a 90° rotation around a central axis that goes perpendicular to, and through, metal layers M1, M2, and M3.

11. The antenna structure of claim 8, wherein there is a first layer of dielectric material between each of metal layers M1 and M2 and there is a second layer of dielectric material between each of metal layers M2 and M3.

12. The antenna structure of claim 11, wherein the first layer of dielectric material and the second layer of dielectric material are each made of the same dielectric material.

13. The antenna structure of claim 11, wherein the first layer of dielectric material has a first thickness and the second layer of dielectric material has a second thickness.

14. The antenna structure of claim 11, wherein metal layer M2 is fed a signal for transmission by way of at least one via that extends through the second layer of dielectric material.

15. An antenna structure, comprising:

at least two antenna arrangements, wherein each antenna arrangement comprises:

two supports; and a plurality of antennas, each of at least two antennas of the plurality of antennas being mounted on a respective one of the supports;

a connector disposed between and physically coupling adjacent edge portions of the two supports;

wherein each of the at least two antennas are mounted on a side of their respective supports so as to face away from each other; and wherein the two supports are laterally displaced from each other along one of their respective edges by a prescribed distance and are arranged to form a prescribed angle between themselves, wherein the prescribed distance is about one half of the wavelength of a center frequency to be transmitted from the antennas mounted to the two supports physically coupled by the connector;

the connector maintaining the prescribed angle and the prescribed lateral displacement between the two supports; and wherein each support of the at least two antenna arrangements has an edge opposite to the edge along which it is displaced from the other supports of the antenna arrangement of which it is a part, and wherein each such opposite edge is arranged to be substantially adjacent to an opposite edge of another one of the antenna arrangements so that the at least two antenna arrangements appear to form a simple polygon.

16. The antenna structure of claim 15, wherein the simple polygon that appears to be formed has one of four, six, and eight sides.

17. The antenna structure of claim 15, wherein the antenna structure provides a full space coverage with sectorization, wherein a number of sectors provided equals a number of antenna arrangements of which the antenna structure is comprised.

18. An antenna structure, comprising:

at least two antenna arrangements, wherein each antenna arrangement comprises:

two supports; and a plurality of antennas, each of at least two antennas of the plurality of antennas being mounted on a respective one of the supports;

a connector disposed between and physically coupling adjacent edge portions of the two supports;

wherein each of the at least two antennas are mounted on a side of their respective supports so as to face away from each other; and wherein the two supports are laterally displaced from each other along one of their respective edges by a prescribed distance and are arranged to form a prescribed angle between themselves, wherein the prescribed distance is equal to one of the group consisting of a distance that is less than the wavelength of a center frequency to be transmitted from the antennas mounted to the two supports physically coupled by the connector and a distance that is about one half of the wavelength of a center frequency to be transmitted from the antennas mounted to the two supports physically coupled by the connector;

the connector maintaining the prescribed angle and the prescribed lateral displacement between the two supports; and wherein at least a portion of another side of each support of each of the at least two antenna arrangements faces at least partly toward a portion of a support of another one of the at least two antenna arrangements.

19. The antenna structure of claim 18, wherein the antenna structure provides a full space coverage with sectorization, wherein a number of sectors provided equals a number of antenna arrangements of which the antenna structure is comprised, and wherein the antenna arrangements are placed so as to provide at least partially overlapping coverage.

* * * * *